United States Patent [19]

Larson et al.

[11] Patent Number: 5,138,681

[45] Date of Patent: Aug. 11, 1992

[54] OPTICAL FIBER SPLICE

[75] Inventors: Donald K. Larson, Cedar Park; Richard A. Patterson, Georgetown, both of Tex.

[73] Assignee: Minnesota Mining and Manufcturing Company, St. Paul, Minn.

[21] Appl. No.: 750,402

[22] Filed: Aug. 29, 1991

Related U.S. Application Data

[63] Continuation-in-part of Ser. No. 692,271, Apr. 26, 1991, Pat. No. 5,102,212, which is a continuation of Ser. No. 437,027, Nov. 15, 1989, Pat. No. 5,013,123, which is a continuation-in-part of Ser. No. 305,471, Feb. 1, 1989, abandoned, which is a continuation of Ser. No. 182,872, Apr. 18, 1988, Pat. No. 4,824,197.

[51] Int. Cl.$^5$ .............................................. G02B 6/36
[52] U.S. Cl. ................................................. 385/95
[58] Field of Search ...................................... 385/95-99

[56] References Cited

U.S. PATENT DOCUMENTS

| | | | |
|---|---|---|---|
| 3,864,018 | 1/1975 | Miller | 350/96 |
| 4,028,162 | 6/1977 | Cherin et al. | 156/158 |
| 4,029,390 | 6/1977 | Chinnock et al. | 350/96 |
| 4,045,121 | 8/1977 | Clark | 350/96 |
| 4,046,454 | 9/1977 | Pugh, III | 350/96 |
| 4,102,561 | 7/1978 | Hawk et al. | 350/96.21 |
| 4,181,401 | 1/1980 | Jensen | 350/96.21 |
| 4,201,443 | 5/1980 | Hodge | 350/96.20 |
| 4,203,650 | 5/1980 | Millet et al. | 350/96.21 |
| 4,211,470 | 7/1980 | Stewart | 350/96.21 |
| 4,220,397 | 9/1980 | Benasutti | 350/96.21 |
| 4,254,865 | 3/1981 | Pacey et al. | 206/316 |
| 4,257,674 | 3/1981 | Griffin et al. | 350/96.21 |
| 4,258,977 | 3/1981 | Lukas et al. | 350/96.21 |
| 4,274,708 | 6/1981 | Cocito et al. | 350/96.21 |
| 4,300,815 | 11/1981 | Malsot et al. | 350/96.20 |
| 4,325,607 | 4/1982 | Carlsen | 350/96.21 |
| 4,339,172 | 7/1982 | Leather | 350/96.21 |
| 4,352,542 | 10/1982 | Tydings | 350/96.21 |
| 4,353,542 | 10/1982 | Schultz | 350/96.21 |
| 4,354,731 | 10/1982 | Mouissie | 350/96.21 |
| 4,391,487 | 7/1983 | Melman et al. | 350/96.20 |
| 4,435,038 | 3/1984 | Soes et al. | 350/96.21 |
| 4,470,180 | 9/1984 | Blomgren | 24/563 |
| 4,593,971 | 6/1986 | Clement et al. | 350/96.20 |
| 4,602,845 | 7/1986 | Anderton | 350/96.20 |
| 4,634,216 | 1/1987 | Calevo et al. | 350/96.21 |
| 4,730,892 | 3/1988 | Anderson et al. | 350/96.21 |
| 4,740,411 | 4/1988 | Mitch | 428/178 |
| 4,865,413 | 9/1989 | Hubner et al. | 350/96.21 |
| 4,871,227 | 10/1989 | Tilse | 350/96.21 |
| 4,930,859 | 6/1990 | Hoffman, III | 350/96.21 |
| 4,940,307 | 7/1990 | Aberson et al. | 350/96.21 |
| 4,973,126 | 11/1990 | Degani et al. | 350/96.21 |
| 5,016,970 | 5/1991 | Nagase et al. | 350/96.21 |

FOREIGN PATENT DOCUMENTS

| | | | |
|---|---|---|---|
| 82102571 | 12/1985 | European Pat. Off. | 6/24 |
| 88303777 | 11/1988 | European Pat. Off. | 6/38 |
| 52-19547 | 2/1977 | Japan . | |
| 53-26142 | 3/1978 | Japan . | |
| 58-9114 | 1/1983 | Japan . | |
| 58-158621 | 9/1983 | Japan . | |

OTHER PUBLICATIONS

Published by Reliance Comm/Tec, Copyright date of 1991, Titled "Reliable Corelink TM Tomorrow's Fiber Opitc Splice Today!" Author: E. C. Scholtens.

*Primary Examiner*—Akm E. Ullah
*Attorney, Agent, or Firm*—Gary L. Griswold; Walter N. Kirn; Jack V. Musgrove

[57] ABSTRACT

An optical fiber splice comprising a hinged splice element having two legs, at least oen of the legs having a groove therein for h olding the fibers to be spliced, a base for receiving the splice element, and a cap fitting over the base which has camming bars extending into the base and around the splice element, the camming bars urging the legs into a closed, clamping state. The camming bars are shorter than the splice element, applying the clamping force only to the center thereof, which allows the legs to flex open at their ends and apply a gradual clamping to the fibers. Alternatively, the camping bars may be thicker at their center and have inwardly facing surfaces which are convex, providing gradual clamping of the fibers which minimizes insertion losses due to microbending. The cap is provided with tabs which hold the cap in open and closed positions, the open positon allowing insertion of the fibers into the splice elements, and the closed position causing the convex surfaces of the camming bars to forcibly contact the legs of the element and thereby clamp the fibers.

20 Claims, 3 Drawing Sheets

OPTICAL FIBER SPLICE

CROSS-REFERENCES TO RELATED APPLICATION

This application is a continuation-in-part of U.S. patent application Ser. No. 07/692,271 filed Apr. 26, 1991, now U.S. Pat. No. 5,102,212 which is a continuation of U.S. patent application Ser. No. 07/437,027 filed in Nov. 11, 1989, now U.S. Pat. No. 5,013,123, which is a continuation-in-part of U.S. patent application Ser. No. 07/305,471 filed Feb. 1, 1989 (abandoned), which is a continuation of U.S. patent application Ser. No. 07/182872 filed on Apr. 18, 1988 now U.S. Pat. No. 4,824,197.

BACKGROUND OF THE INVENTION

1. Field of the Invention

The present invention generally relates to devices for optically splicing waveguides such as optical fibers, and more particularly to a vented, hinged splice element having improved hinge registration and clamping of the optical fiber.

2. Description of the Prior Art

Splices for optical fibers are known in the art. The most critical characteristic of an optical fiber splice is its insertion loss, i.e., the signal loss due to misalignment of the fibers, which may occur in three different manners. First of all, the fiber end faces should abut each other as closely as possible (end offset). The provision of a refractive index matching medium (gel) at the interface may mitigate the effects of any air space left between the end faces. Secondly, the fiber axes proximate the interface should be generally parallel, so that light exiting one fiber will strike the surface of the second fiber as closely as possible to a right angle, or 0° angle of incidence (axial or angular offset). Finally, the axes of the fibers should be transversely aligned to maximize the overlapping surface area between the end faces (lateral or transverse offset). This alignment is critical since the diameter of the central glass core of single mode fibers is only about 8 $\mu$m, so a deviation in axial alignment of as little as 1 $\mu$m may result in a significant loss.

Several prior art optical fiber splicing devices attempt to optimize fiber alignment by utilizing a chip or tray having one or more grooves therein which receive the optical fibers. See, e.g., U.S. Pat. Nos. 3,864,018; 4,028,162; 4,046,454; 4,102,561; 4,220,397; 4,730,892; and 4,865,413. The grooves in the substrate provide a simple method for holding the fibers, which are forcibly held in the grooves by a compression plate or adjacent groove tray, or by the use of adhesives. The grooves may be concave or V-shaped. Concave grooves result in two primary points of contact with the fiber, while a V-groove with an opposing flat surface provides three points of contact. V-grooves in two opposing trays result in four points of contact, as shown in FIG. 4 of U.S. Pat. No. 4,046,454.

Some prior art splices combine the V-groove concept with a foldable or hinged splice element. See, e.g., U.S. Pat. Nos. 4,029,390; 4,254,865; 4,818,055; and 4,865,412; and Japanese Patent Applications (Kokai) Nos. 53-26142 and 58-158621. This basic design offers several advantages, including ease of manufacture (via stamping), low insertion force (preventing buckling or deformation of the fibers), fiber retention without the use of adhesives or epoxies, and reusability.

In spite of the foregoing achievements, however, the mass splicing of fibers in a reliable, quick and economic fashion remains a problem. For example, prior art hinged splice elements do not always bend along the same line on the splice element, and there is a high rejection rate during production. Without precise folding of the element, parallel to the fiber receiving grooves, fiber alignment and retention is affected since it results in inaccurate registration of the two halves of the splice element, and is especially critical when the two halves have complimentary V-grooves. It has also been found that ductile hinge elements, such as that disclosed in U.S. Pat. No. 4,824,197 (not prior art), require an annealing step after embossing in order to provide a hinge which will consistently survive a 180° fold.

The sudden clamping transition near the fiber interface also causes deformation of the fiber resulting in more signal loss than if there were a more gradual clamping toward the interface.

Prior art optical splices also do not adequately address the optimum geometry for V-groove designs. For example, in the previously referred to FIG. 4 of U.S. Pat. No. 4,046,454, the V-grooves have obtuse angles, meaning that the four points of contact will not be completely symmetrical about the fiber. This may result in unnecessary transverse offset of the fibers, leading to greater splice loss. This is also true for hinged splice elements wherein a flat surface compresses the fiber into a 60° V-groove. Since the flat surface is hinged to the grooved surface, and since the fiber is only partially embedded in the groove, the flat surface is not parallel to the groove-bearing surface when the splice element is in its closed, clamping state. See, e.g., U.S. Pat. No. 5,013,123 (this patent does not constitute prior art). Since these two surfaces are not parallel, the three lines or surfaces contacting the fiber will not be symmetrically positioned about the fiber, again adversely affecting transverse offset of the fiber end faces.

One final disadvantage relating to prior art optical splices concerns the use of a medium for matching the index of refraction of the two fibers. As mentioned above, reflective losses may be minimized by placing an index matching fluid or gel at the fiber interface. Oftentimes, however, this gel has bubbles, contaminants or other discontinuities which tend to migrate during the splice operation, and thereafter with temperature cycling. Such migration of the gel and microbubbles can detrimentally affect the splice quality. It would, therefore, be desirable and advantageous to devise an optical splice element which would obviate any problems associated with gel migration, as well as overcome the aforementioned limitations regarding a predictable hinge fold line, optimum V-groove geometry, and gradual clamping of the splice element.

SUMMARY OF THE INVENTION

The foregoing objective is achieved in an optical splice element comprising a thin sheet of deformable material having on one surface thereof a notched web forming a focus hinge connecting two leg portions of the sheet, and providing an accurate and predictable fold line. At least one of the leg portions has a V-groove embossed therein, and the other of the leg portions has either another V-groove or a contact surface positioned so as to lie adjacent the V-groove on the first leg portion when the legs are folded toward one another along the fold line defined by the longitudinal notch. Means are provided to gradually clamp the central portions of the legs to minimize insertion loss from a sudden clamping transition.

Optimum V-groove geometry is achieved by offsetting the angle of the V-grooves with respect to the plane of the leg, or by offsetting the angle of the contact surface. The value of the interior angle of the V-groove(s) depends upon the number of points or lines which will contact the fiber placed in the groove. This value may be decreased slightly whereby, when the fiber is clamped between the legs and the ductile surface of the V-groove deforms, the deformation results in an effective angle corresponding to the desired optimum angle. A vent hole is provided at the center of the splice element to prevent migration of microbubbles in the index matching gel across the fiber interface. Alternatively, sealing rails may be formed on one leg if the surfaces of the two legs are in intimate contact when the element is in a closed, clamping state.

BRIEF DESCRIPTION OF THE DRAWINGS

The novel features and scope of the invention are set forth in the appended claims. The invention itself, however, will best be understood by reference to the accompanying drawings, wherein:

DESCRIPTION OF THE PREFERRED EMBODIMENT

Figure 1:
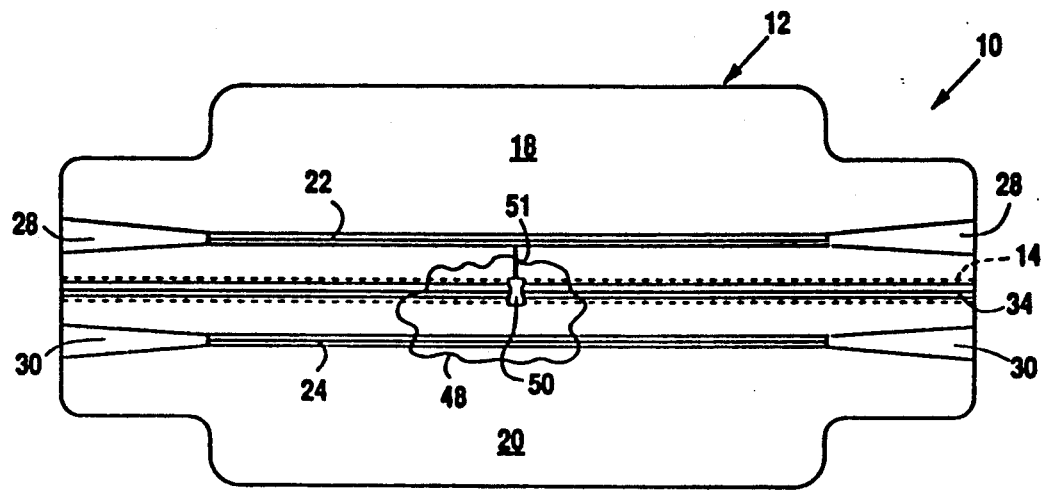
FIG. 1 is a top plan view of the splice element of the present invention in its unfolded state.

With reference now to the figures, and in particular with reference to FIG. 1, there is depicted the optical fiber splice element 10 of the present invention. Splice element 10 is somewhat similar to the splice elements described in U.S. Pat. Nos. 4,824,197 and 5,013,123, the disclosures of which are hereby incorporated by reference. Splice element 10 is formed from a sheet 12 of deformable material, preferably a ductile metal such as aluminum, although polymeric materials may also be used, such as polyethersulfone. Material selection is described further below. Although the term "connector" may be applied to splice element 10, that term is usually reserved for devices which are intended to provide easy connection and disconnection, as opposed to a splice which is usually considered permanent. Nevertheless, the term "splice" should not be construed in a limiting sense since splice element 10 can indeed allow removal of the spliced fiber.

Figure 2:
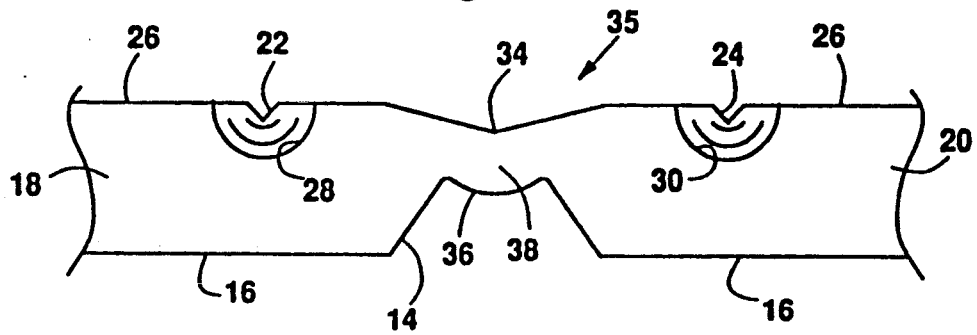
FIG. 2 is a side elevational view of the splice element in its unfolded state, showing the focus hinge defined by a longitudinal notch.

With further reference to FIG. 2, certain features of splice element 10 are embossed, coined, stamped or molded into sheet 12. First of all, a groove 14 is formed on the outside surface 16 of sheet 12, extending generally the length of sheet 12. Groove 14 is centrally located, forming an area of reduced thickness which defines a hinge that separates sheet 12 into two identical plate-like members or legs 18 and 20. In one embodiment of the present invention, both of these legs have V-shaped grooves 22 and 24 embossed on the inside surface 26 of sheet 12. It should be noted that it is not necessary for the grooves to have a sharp angle in order to be considered V-shaped; given the small dimensions involved, the apex of the "V" may be somewhat curved or even flattened out, but the overall shape is still generally that of a "V." V-grooves 22 and 24 are generally parallel with groove 14, and equidistant therefrom, but do not extend the full length of sheet 12. Concave recesses 28 and 30 lie adjacent grooves 22 and 24, respectively, whereby, when legs 18 and 20 are folded together (as shown in FIG. 3), recesses 28 and 30 form a lead-in cone for an optical fiber 32.

A key feature of the present invention involves improvements in the hinge which provide a fold line allowing precise transverse registration of V-grooves 22 and 24. The essential improvement in this regard is the provision of another groove or notch 34 on surface 26, opposite groove 14. Notch 34, which preferably takes the shape of a shallow "V," lies above the centerline of groove 14. Empirical testing has shown that provision of such a focus hinge 35 provides more accurate registration of legs 18 and 20 than if notch 34 were not present, to within about ±30 μm (3 σ). Moreover, the registration is very predictable and repeatable, making the folding step non-critical. Focus hinge 35 may be utilized to register any kind of groove, not only those that are V-shaped. Even if only One of the legs 18 or 20 had a groove therein, obviating the need for alignment of opposing grooves, it would still be desirable to use focus hinge 35 to provide optimum registration of recesses 28 and 30 in order to form a proper lead-in cone.

The added predictability in the use of focus hinge 35 may be further enhanced by cutting or embossing groove 14 in such a manner as to form a convex surface 36 on one side of the hinge web 38. This forms a partial bend radius at the hinge, and allows hinge web 38 to be thicker without hampering the bending qualities. The increased thickness in turn imparts structural integrity and, in testing, this hinge has survived full closing and reopening without failure. The splice elements shown in the previously mentioned U.S. Pat. Nos. 4,824,197 and 5,013,123 require only a 90° bend at each hinge, but the hinge in splice element 10 must survive a bend of nearly 180°; the splice elements shown in those patents require a post-embossing annealing step to survive such a fold, but this is not necessary with focus hinge 35.

Figure 3:
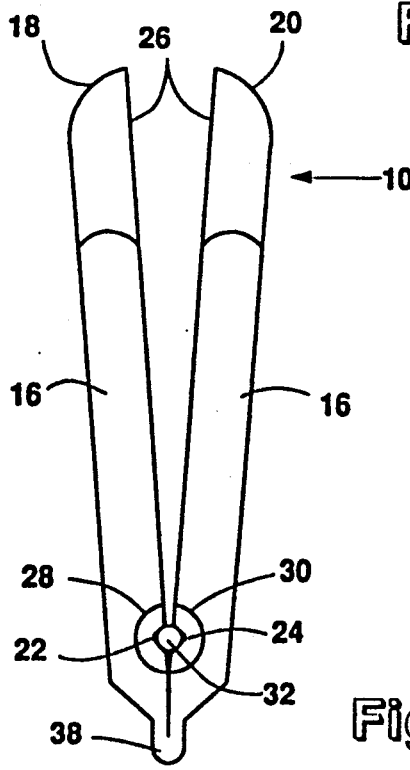
FIG. 3 is a side elevational view of the splice element in its folded state, with a fiber disposed in the V-grooves.

Referring now to FIG. 3, optical fiber splice element 10 is depicted in its closed state, clamping a fiber 32 between V-grooves 22 and 24 of legs 18 and 20. Splice element 10 may be preloaded in the folded state (although not in the closed, clamping state) in an optical splice connector body such as that shown in U.S. Pat. No. 4,818,055 (the disclosure of which is hereby incorporated). Such a splice body includes a base and a cap. As the cap is moved from an open position to a closed position, two cam bars slide over legs 18 and 20, urging them toward one another. It is desirous to provide rounded edges along outside surface 16 of legs 18 and 20 to facilitate the camming action.

Sheet material 12 should be sufficiently deformable so as to partially conform to the surface of optical fiber 32 at the points of contact. In addition to improved signal transmission, this also results in greater fiber retention and facilitates splicing of two fibers of differing diameters. Sheet 12 may therefore be constructed from a variety of ductile metals, such as soft aluminum. The preferred metal is an aluminum alloy conventionally known as "3003," having a temper of 0 and a hardness on the Brinnell scale (BHN) of between 23 and 32. Another acceptable alloy is referred to as "1100," and has a temper of 0, H14 or H15. Acceptable tensile strengths vary from 35 to 115 megapascals.

Other metals and alloys, or laminates thereof, may be used in the construction of sheet 12. Such metals include copper, tin, Zinc, lead, indium, gold and alloys thereof. It may be desirable to provide a transparent splicing element to facilitate the splicing operation. In such a case, a clear polymeric material may be used for sheet 12. Suitable polymers include polyethylene terephthalate, polyethylene terephthalate glycol, acetate, polycarbonate, polyethersulfone, polyetheretherketone, polyetherimide, polyvinylidene fluoride, polysulfone, and copolyesters such as VIVAK (a trademark of Sheffield Plastics, Inc., of Sheffield, Mass.).

As an alternative to providing a sheet constructed of a deformable material, sheet 12 may instead be constructed of a more rigid material provided that the V-grooves and contact surfaces are lined or coated with a deformable material. The primary requisite is to provide a material which is softer than the glass comprising the optical fiber and cladding, and which is ductile under the clamping pressures applied to the optical fiber. It is also desirable that the material be elastic at low stress levels to afford sufficient elasticity to maintain a continual compressive force on the optical fibers once legs 18 and 20 have been brought together. Furthermore, a coating may be applied to the ductile material to reduce skiving of the material as the fiber is inserted. For example, an obdurate coating having a thickness in the range of one to two $\infty$m may be applied to surface 26 of splice element 10.

The dimensions of sheet 12 may Vary considerably depending upon the application; the following dimensions are considered exemplary and are not to be construed in a limiting sense. The size of sheet 12 is about 18 mm long by 8 mm wide along the major edges. For both metal and polymeric materials, the preferred thickness is about 0.51 mm. The width of notch 34 is about 0.56 mm while its maximum depth, measured from surface 26, is about 0.1 mm. The width of groove 14 is approximately 1.1 mm measured across surface 16, and 0.46 mm measured across hinge web 38; its maximum depth, measured from surface 16, is about 0.33 mm. Convex surface 36 has a radius of curvature of about 0.39 mm. Based on the foregoing values, V-grooves 22 and 24 are preferably placed about 0.9 mm from the fold line defined by notch 34. V-grooves 22 and 24 should have a maximum width of about 129 $\mu$m.

Figure 4A:
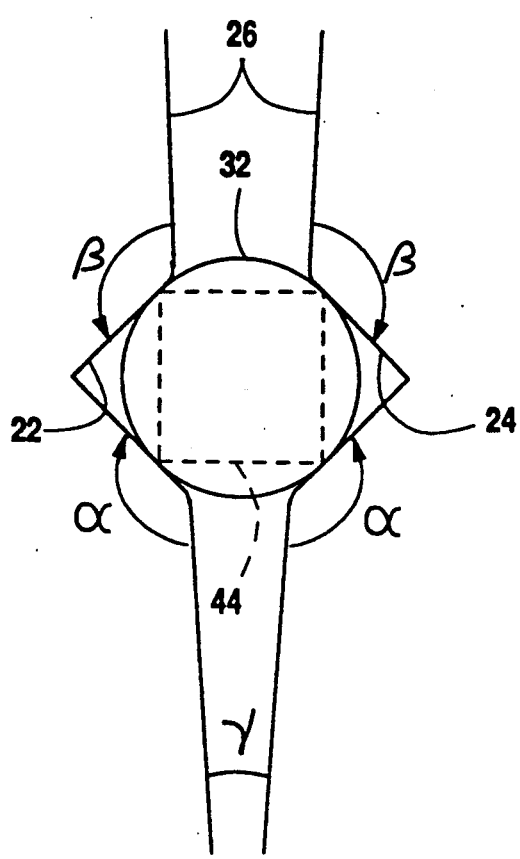
FIGS. 4A and 4B are detail diagrams depicting the angular geometry of the V-grooves and contact surface.
Figure 4B:
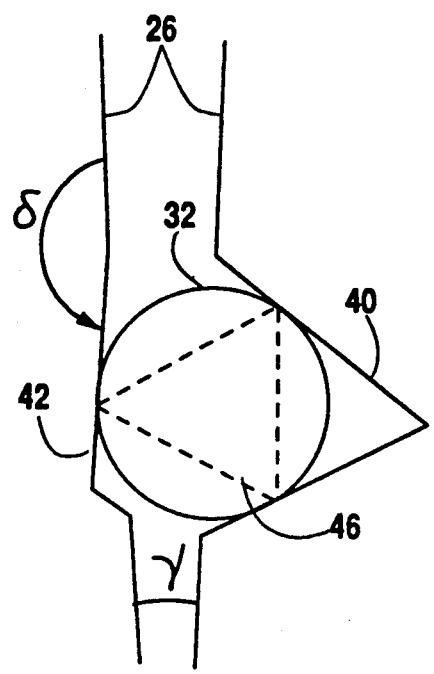

FIGS. 4A and 4B illustrate the novel angular geometries of the V-grooves used in splice element 10. As noted in the Description of the Prior Art, prior art splices having V-grooves do not clamp the fiber in a completely symmetrical fashion, resulting in unnecessary fiber deformation and greater splice loss. Splice element 10, in contrast, optimizes the radial alignment of forces impacting the fiber by counterbalancing the locations of the splice-fiber interfaces. In splice element 10, where legs 18 and 20 are still separated by a small angle in the closed, clamping state, this is accomplished by offsetting the V-groove angles with respect to the plane of surface 26.

In FIG. 4A, V-grooves 22 and 24 have interior right angles, but the angles $\alpha$ and $\beta$ are not equal. Rather, they are chosen to complement the angular separation of legs 18 and 20. Specifically, in the embodiment where legs 18 and 20 are separated by an angle $\gamma$ of about 6° in the closed, clamping state, the angles $\alpha$ are about 138°, i.e., the supplementary angles of inclination are about 42°. The angles $\beta$ are accordingly about 132°, i.e., the supplementary angles of inclination are about 48°. It can be seen that these angles (for two opposing V-grooves) are determined by the equations $\alpha = 135° + \gamma/2$, and $\beta = 135° - \gamma/2$. It would, of course, be equivalent to make both angles of inclination of one V-groove 45° and provide the angular offset in the second V-groove, i.e., making its angle $\alpha = 135° + \gamma$, and its angle $\beta = 135° - \gamma$.

In the embodiment of FIG. 4B (which is presently considered to be the preferred embodiment), there is only one V-groove 40 with an interior angle of 60° (and angles of inclination with respect to surface 26 also of 60°). A complementary contact surface 42 is provided which has an angular offset $\delta$ with respect to surface 26 (contact surface 42 is thus a "groove" as that term is used in the claims). The angle $\delta$ is simply $180° - \gamma$ ($\gamma$ is again preferably 6°). Another way of expressing these constructions is that, even though the two surfaces 26 are not parallel, the points of contact between splice element 10 and fiber 32 form an essentially regular polygon, such as the square 44 in FIG. 4A and the equilateral triangle 46 in FIG. 4B. The basic principle of offsetting the angular geometries of the grooves may also be applied to splices having more than four contact points. Focus hinge 35 also enhances the usability of such multiple surface clamps, as well as grooves having a semicircular cross-section. Optimizing these geometries also provides improved alignment of different sized fibers.

Upon reference to the description provided herein, those skilled in the art will appreciate that, since the optical fiber may become slightly embedded in a groove formed of a ductile material, it may be desirable to provide an initial groove angle slightly less than that ultimately desired for symmetric alignment of the fiber within the groove. For example, if splice element 10 uses two opposing V-grooves as shown in FIG. 4A, the interior groove angles should actually be slightly less than 90°. In this manner, when the fiber is clamped between legs 18 and 20, the ductile material along the surfaces of V-grooves 22 and 24 will deform at the points of contact with fiber 32, yielding an effective angle of about 90°. In this regard, the term "effective angle" refers to that angle defined by the apex of the V-groove and the points of maximum deformation of the ductile material where it contacts the fiber. Similarly, if the splice utilizes only one V-groove, as shown in FIG. 4B, the interior angle should be slightly less than 60°.

Figure 5:
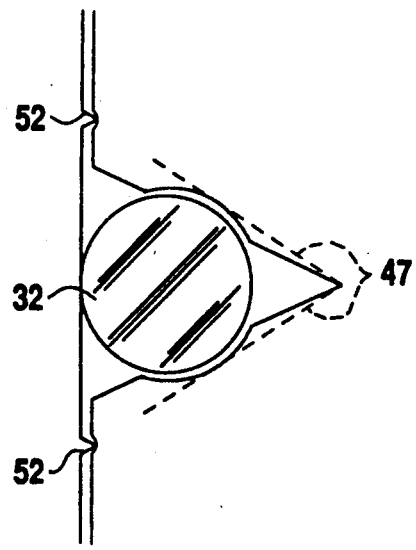
FIG. 5 is a detail diagram illustrating the provision of a smaller V-groove angle to compensate for the deformation of the ductile surface of the V-groove, and also showing rails which provide sealing of the index matching gel.

This is further depicted in FIG. 5, which shows a splice element wherein the inner surfaces of the legs are essentially parallel when the element is in the closed clamping state. FIG. 5 illustrates the deformation of the V-groove surfaces, and how the initial angle formed in the V-groove differs from the effective angle which is indicated by dashed lines 47. While the value of the interior V-groove angle depends primarily on the amount of ductile material which is displaced, this in turn depends upon the malleability of the material comprising the surfaces of the V-groove and the driving force which urges fiber 32 into the V-groove. Since a wide variety of materials may be used for splice element 10, and since there are several different mechanisms for applying the clamping force to the element, it is impossible to provide a single value for the interior angle which will result in an optimum effective angle. In the preferred embodiment of FIG. 4B, utilizing the clamping cap described below, an angle in the range of 46°–59° has been empirically found to approximately yield the optimum effective V-groove angle of 60°.

Referring back to FIG. 1, splice element 10 preferably has a gel 48 disposed therein which has an appropriate index of refraction to improve transmission of light across the fiber-to-fiber interface. Such gels are conventionally available. As noted in the Description of the Prior Art, the use of such a gel may result in the detrimental migration of microbubbles or other contaminants along the fiber-to-fiber interface. Such migration may be arrested by the provision of a vent hole 50 near the center of splice element 10. Venting the area below focus hinge 35, adjacent the fiber interface, eliminates the pressure differential which would otherwise cause gel migration across the interface, particularly during temperature cycling. Vent hole 50 may be punched into sheet 12 when splice element 10 is cut out; subsequent embossing of the various grooves and notches typically results in an hourglass shape of vent hole 50. In the preferred embodiment, vent hole 50 has a diameter of about 0.76 mm. A longitudinal vent channel 51 may optionally be embossed in surface 26 between vent hole 50 and grooves 22 and 24 to provide fluid communication between vent hole 50 and the grooves.

As an alternative to providing a vent hole, means may be provided to block the flow of the index matching gel, such as providing a barrier on either side of the V-groove proximate the fiber interface, rather than preventing the flow by eliminating any pressure differentials. For example, in the embodiment of FIG. 5, wherein the inner surfaces of the legs are in intimate contact when the element is in the closed, clamping state, features may be formed in one or both of the legs to providing sealing around the V-groove. One such means is a pair of ribs or rails 52 formed on the surface of one of the legs. Thus, when the element is closed, rails 52 impinge on the opposing surface, causing slight deformation thereof, and provide an environmental seal which prevents gel migration near the fiber interface.

Figure 6:
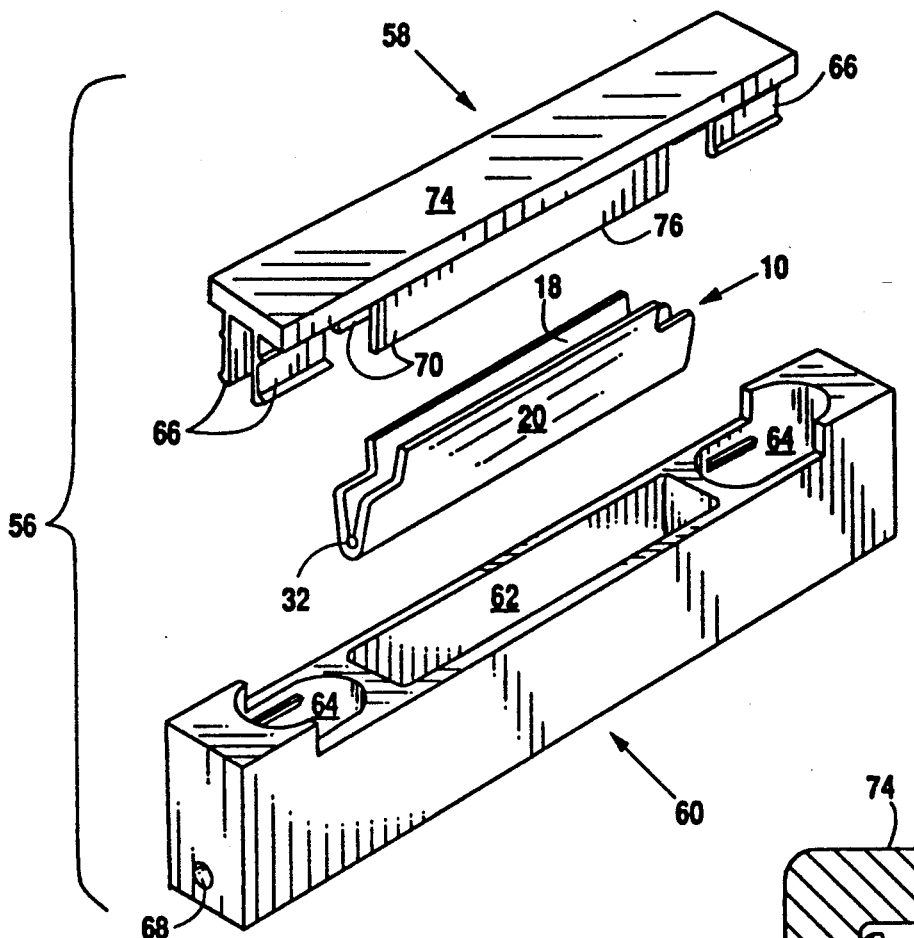
FIG. 6 is an exploded perspective view of the complete splice of the present invention, including the splice body and splice element.
Figure 8:
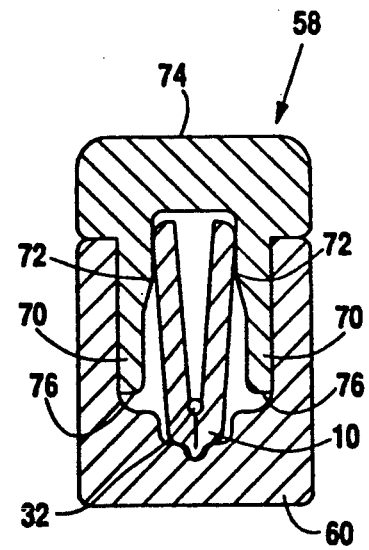
FIG. 8 is a cross-section taken along the center of the closed splice depicting clamping of the splice element.
Figure 7:
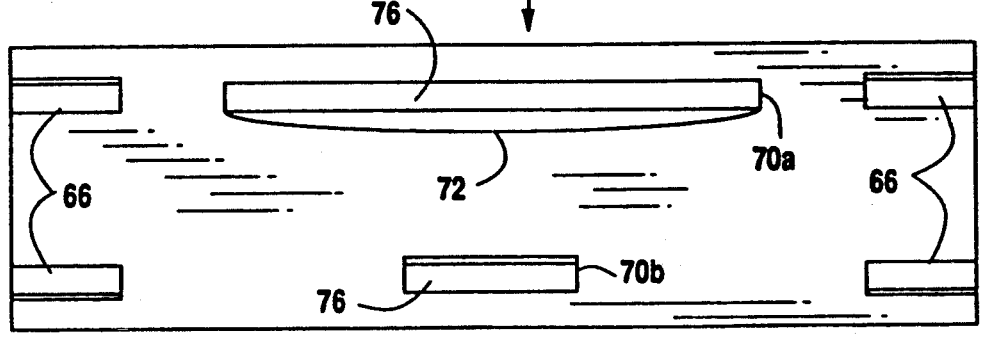
FIG. 7 is a bottom plan view of the cap of the splice body of the present invention.

Turning to FIGS. 6–8, those figures depict the novel splice body 56 which is used to hold and actuate splice element 10. Splice body 56 is essentially identical to the splice body described in U.S. Pat. No. 4,818,055, except for the provision of a gradual or centralized clamping cam as discussed further below. Splice body 56 includes a cap member 58 and a base member 60. Base 60 has an opening or central cavity 62 therein for receiving splice element 10, and two side cavities 64 for receiving locking tabs 66 of cap 58. Locking tabs 66 securely attach cap member 58 to base member 60. The end walls of base 60 further have holes 68 therein which allow the insertion of the optical fiber into the preassembled splice.

In addition to locking tabs 66, cap 58 also has two generally parallel camming bars 70 which extend perpendicularly into cavity 62 and surround splice element 10. Locking tabs 66 and camming bars 70 are preferably integrally molded with cap member 58. In the preassembled state, cap 58 is not fully inserted into base 60, allowing element 10 to remain in a slightly opened state, with the legs diverging, facilitating insertion of the optical fiber into the V-grooves thereof. Then, as cap 58 is forced fully into base 60, camming bars 70 forcibly contact legs 18 and 20 of element 10, forcing them towards one another and clamping the optical fiber.

The improvement in splice body 56 lies in the gradual thickening of the camming surfaces 72 of camming bars near their center, as with camming bar 70a shown in FIG. 7, which is a bottom plan view of cap 58. The cross-section of FIG. 8 is taken at the center of the actuated splice, and additionally illustrates how camming bars 70 are thinner at their distal edges 76 than at the point of attachment to upper plate 74. In other words, camming bar 70a defines an inwardly facing convex surface 72 where it joins the upper plate 74 of cap member 58. Alternatively, the camming bars may be much shorter in length than splice element 10, such as camming bar 70b. In this manner, element 10 is allowed to flex open at its ends, and there is a gradual clamping of the fiber towards the center. Both of these constructions have been found to decrease insertion loss associated with the microbends or deformations of the fiber which are found in other optical fiber splices. If camming bars such as 70a are used, they are preferably about 18 mm long, and the minimum distance between the bars, at their center, is about 1.3 mm. It is understood that gradual clamping may also be achieved if only one of the camming bars is so curved or thickened, the other having a flat inwardly facing surface. In the preferred embodiment, however, camming bars such as 70b are used and are about 6.4 mm long, again with a distance between the bars of about 1.3 mm. The improved camming bars 70a and 70b may be used with splice element 10, or with the splice element shown in U.S. Pat. No. 4,818,055, or with other splice elements requiring the clamping of two opposing legs or plate-like members.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, splice element 10 may be provided with tabs similar to that shown in U.S. Pat. No. 4,824,197 for securing the element in a closed state. Splice element 10 may also contain multiple grooves for splicing more than one fiber pair. It is therefore contemplated that the appended claims will cover such modifications that fall within the true scope of the invention.

I claim:

1. An article for splicing two optical fibers together, comprising:

splice means including first and second leg members, each having two ends and a center, and means for holding the fibers between said leg members;

a base member having first and second end walls, each having a hole therein for insertion of one of the fibers, said base member further having a cavity, said splice means being positioned in said cavity; and a cap member having means for applying a gradual clamping force to said first and second leg members whereby said clamping force is higher at said centers of said first and second leg members than at said ends thereof.

2. The article of claim 1 wherein said means for applying a gradual clamping force includes first and second camming bars attached to said cap member, said first and second camming bars forcibly contacting said first and second leg members, respectively, and urging them towards one another.

3. The article of claim 1 wherein said means for applying a gradual clamping force includes first and second opposed, convex surfaces forcibly contacting said first and second leg members, respectively, and urging them towards one another.

4. The article of claim 1 wherein said cap member comprises:
   a plate member;
   a first camming bar attached to and extending generally perpendicularly from said plate member, and having two ends and a center, said first camming bar being thicker at said center than at said ends; and
   a second camming bar attached to and extending generally perpendicularly from said plate member, and being generally parallel with said first camming bar.

5. The article of claim 1 wherein said cap member comprises:
   a plate member;
   first and second camming bars attached to and extending generally perpendicularly from said plate member, said first and second camming bars being generally parallel and having inwardly facing surfaces, at least one of said inwardly facing surfaces being convex.

6. The article of claim 1 further comprising means for securely attaching said cap member to said base member.

7. The article of claim 1 wherein:
   said splice means comprises a splice element having a hinge forming a fold line, said first and second leg members being folded toward one another but slightly diverging in a relaxed state; and
   said means for applying a gradual clamping force to said first and second leg members comprises first and second camming bars, shorter in length than said first and second leg members, respectively, contacting said centers of said first and second leg members, respectively, whereby said centers of said leg members are urged toward one another but said ends of said first and second leg members are allowed to flex away from one another.

8. The article of claim 1 wherein said means for holding the fibers between said leg members comprises at least one groove formed in one of said first or second leg members.

9. The article of claim 4 wherein said second camming bar also has two ends and a center, and said second camming bar is thicker at said center than at said ends thereof.

10. The article of claim 5 wherein both of said inwardly facing surfaces of said first and second camming bars are convex.

11. The article of claim 6 wherein:
    said base member further includes first and second side cavities; and
    said means for securely attaching said cap member to said base member comprises first and second sets of locking tabs attached to said cap member, extending into said first and second side cavities, respectively.

12. The article of claim 9 wherein said first and second camming bars each have distal edges, and are both thinner at said distal edges than at their point of attachment to said plate member.

13. An article for splicing two optical fibers together, comprising:
    a base having first and second end walls, each having a hole therein for insertion of one of the fibers, said base further having an opening defining a cavity;
    a hinged splice element positioned in said cavity of said base, having a fold line defining first and second leg members, each having two ends and a central portion, said splice element including means for guiding and holding the fibers between said leg members;
    a cap having means for applying a gradual clamping force to said first and second leg members whereby said clamping force is higher at said central portions of said first and second leg members than at said ends thereof; and
    means for securely attaching said cap to said base.

14. The article of claim 13 wherein said means for applying a gradual clamping force includes first and second camming bars attached to said cap, said first and second camming bars being shorter than said first and second leg members, respectively, and forcibly contacting said central portions of said first and second leg members, respectively.

15. The article of claim 13 wherein said means for applying a gradual clamping force includes first and second opposed, convex surfaces of said cap, forcibly contacting said first and second leg members, respectively.

16. The article of claim 13 wherein said cap comprises:
    an upper plate;
    a first camming bar attached to and extending generally perpendicularly from said upper plate, and having two ends and a center, said first camming bar being thicker at said center than at said ends; and
    a second camming bar attached to and extending generally perpendicularly from said upper plate, and being generally parallel with said first camming bar, said second camming bar also having two ends and a center, and being thicker at said center than at said ends thereof.

17. The article of claim 13 wherein said cap comprises:
    an upper plate;
    first and second camming bars attached to and extending generally perpendicularly from said upper plate, said first and second camming bars being generally parallel and each having an inwardly facing surface, both of said inwardly facing surfaces being convex.

18. The article of claim 13 wherein said means for securely attaching said cap to said base includes means for disposing said cap in first and second positions whereby, when said cap is in said first position, said first and second leg members are slightly diverging and allow insertion of fibers therebetween and, when said cap is in said second position, said gradual clamping force is applied to said first and second leg members.

19. The article of claim 18 wherein said means for applying a gradual clamping force to said first and second leg members includes first and second camming bars attached to said cap, each have distal edges, and both of said camming bars are thinner at said distal edges than at their point of attachment to said cap.

20. An optical fiber splice for splicing two optical fibers together, comprising:

a base having first and second end walls, each having a hole therein for insertion of one of the fibers, said base further having an opening defining a central cavity, and having first and second side cavities;

a hinged splice element positioned in said central cavity of said base, having a fold line defining first and second legs, each having two ends and a central portion, at least one of said legs having a groove therein for holding the fibers;

a cap having an upper plate, and first and second camming bars attached to and extending generally perpendicularly from said upper plate, said first and second camming bars being shorter than said first and second legs, respectively, and further contacting only said central portions of said first and second legs, respectively; and means for securely attaching said cap to said base.

* * * * *